United States Patent [19]
Nersesian

[11] 3,926,275
[45] Dec. 16, 1975

[54] ACCELERATOR PEDAL SNAP ACTING SIGNALING DEVICE FOR ESTABLISHING A PREDETERMINED FORCE-DISTANCE CHARACTERISTIC

[76] Inventor: Leonard S. Nersesian, 7138 Scarborough Peak Drive, Canoga Park, Calif. 91304

[22] Filed: June 24, 1974

[21] Appl. No.: 482,369

[52] U.S. Cl................. 180/77 R; 116/57; 116/116; 74/513; 180/106
[51] Int. Cl.²................... G05G 01/14; B60K 31/00
[58] Field of Search ......... 116/DIG. 34, DIG. 36, 116/DIG. 37, 28 R, 35 R, 67 R, 56, 74, 57, 116/116; 74/513, 514, 560; 180/105 R, 180/106, 77 R, 109; 46/189; 73/132

[56] References Cited
UNITED STATES PATENTS

| | | | |
|---|---|---|---|
| 749,482 | 1/1904 | Geistert | 46/189 |
| 2,312,031 | 2/1943 | Coutcher | 74/513 X |
| 2,506,940 | 5/1950 | Ryder | 74/513 X |
| 2,519,859 | 8/1950 | Teetor | 180/109 |
| 2,521,624 | 9/1950 | Arnet | 180/106 X |
| 2,732,729 | 1/1956 | Joyce | 116/116 X |
| 2,825,418 | 3/1958 | Kershman | 74/514 X |
| 3,432,964 | 3/1969 | Visitacion | 46/189 |
| 3,774,471 | 11/1973 | Pezza | 74/560 |

Primary Examiner—Richard C. Queisser
Assistant Examiner—Daniel M. Yasich

[57] ABSTRACT

A device for establishing a predetermined force-distance characteristic for an accelerator pedal. The device is constructed of an elastic member having certain predetermined characteristics and a mounting means for mounting the member in relation to an accelerator pedal of a vehicle, whereby movement of the pedal in the direction of increased acceleration increases the force applied to the elastic member. The elastic member has a first force-distance characteristic at relatively short distances, and a second force-distance characteristic at relatively long distances, the force-distance characteristic defined graphically by applied force as an ordinate, and by distance of movement as an abscissa, the slope of the first characteristic being substantially greater than that of the second characteristic. Upon the application of increasing force to the accelerator pedal and thus to the elastic member, the member exhibits a snap action from the first characteristic to the second characteristic at a predetermined force level. The device is adapted to produce an audible sound at the occurrence of the snap action, which sound alerts the driver of the vehicle that the accelerator pedal has reached a predetermined position beyond which the efficiency of fuel usage of the vehicle is diminished.

18 Claims, 14 Drawing Figures

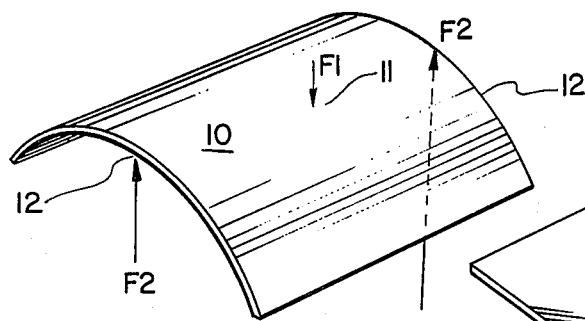
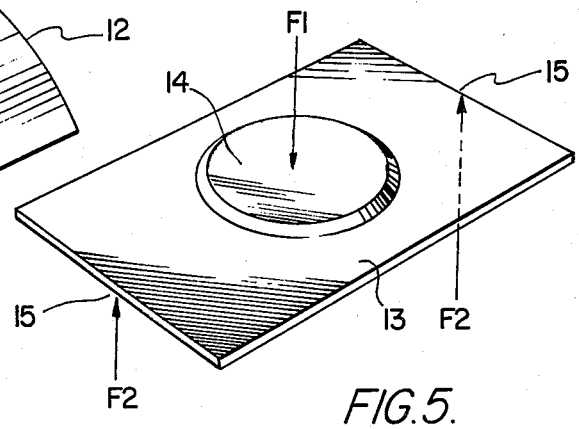
FIG.4.  FIG.5.
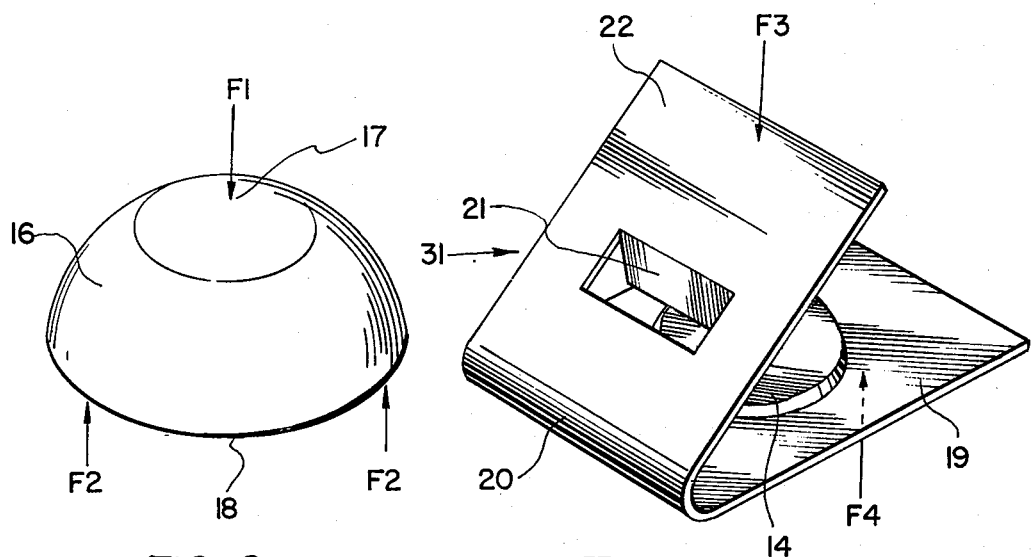
FIG.6.  FIG.7.
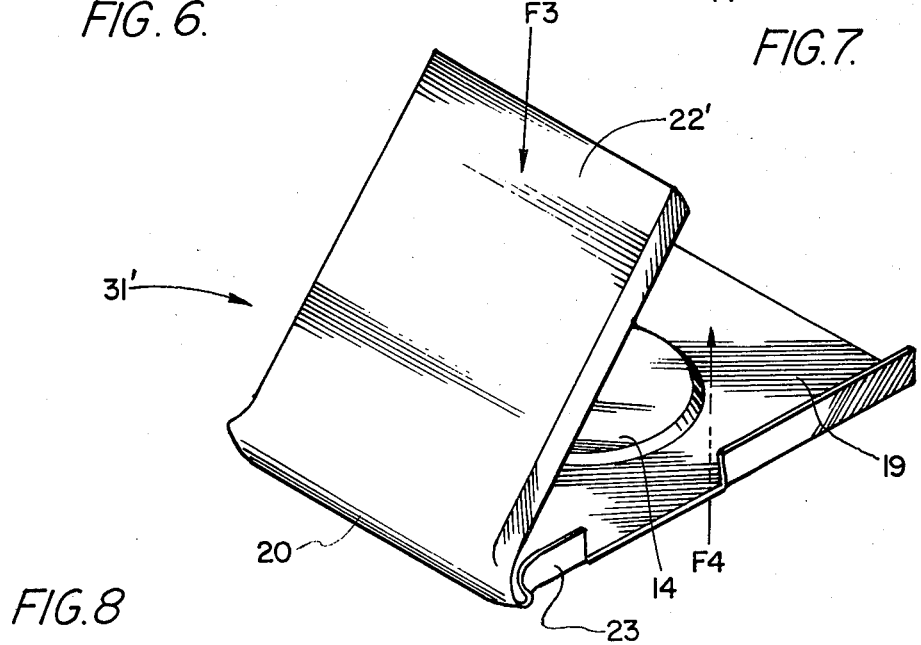
FIG.8

3,926,275

ACCELERATOR PEDAL SNAP ACTING SIGNALING DEVICE FOR ESTABLISHING A PREDETERMINED FORCE-DISTANCE CHARACTERISTIC

BACKGROUND OF THE INVENTION

1. Field of the Invention

This invention relates to the field of vehicle accelerator signaling devices, and in particular relates to a simplified, low cost device for alerting the driver of a vehicle that the accelerator pedal has exceeded a predetermined limit.

2. Description of the Prior Art

Motor vehicle acceleration signaling devices are known in which a signal and/or change of operation of the accelerator pedal is effected when the operation of the automobile indicates a condition of inefficient use of fuel. One such device is described in U.S. Pat. No. 2,825,418 in the name of P. Kershman and dated Mar. 4, 1958. In such a device, an expensive and complex arrangement of a piston, vacuum lines, springs, a cam, and complicated mounting means are required to alert the driver that inefficient operation of the vehicle is taking place. According to the prior art device, a cam is selectively rotated dependent upon the pressure in the intake manifold of the automobile engine, the cam giving way tending to decrease accelerator depression when the driver presses the accelerator pedal too rapidly for efficient motor operation. Under these conditions, the vacuum or suction in the intake manifold will decrease and the cam rotated to cause a sudden collapsing of the accelerator pedal toward the floorboard. If the driver's foot remains relatively fixed, the vacuum increases to restore the cam to its normal position raising the accelerator pedal back in a direction away from the floorboard.

In such prior art devices, considerable modification of the vehicle must take place in order to gain advantage of the device. In particular, the accelerator pedal must be completely dismantled and discarded, a new accelerator pedal installed, vacuum lines installed to the system vacuum source, a piston and piston rod assembly must be mounted in the vehicle, and various linkages must be attached for proper operation. Thus, in addition to the extreme cost of the signaling device, considerable expense in labor costs to install such device reduces the attractiveness thereof. Additionally, since only a movement of the pedal is effected by the inefficient operation of the vehicle, only one of the driver's senses is alerted to the inadvertent misuse of the vehicle.

SUMMARY OF THE INVENTION

The present invention overcomes the above-noted deficiencies of prior art devices by providing a simple, inexpensive, and easily installed alerting device which stimulated the audible senses of the driver in addition to the sense of feel when the accelerator pedal is abruptly and automatically released.

Although other uses of such a device might be contemplated, the primary use of the invention is to signal the driver of a motor vehicle that the accelerator pedal is being depressed in excess of what is actually needed for a predetermined driving condition. The device can be used in conjunction with the spring return arrangement installed in the vehicle, or it can be used in substitution therefor. In the most desirable application of the device, no alteration to the vehicle is required. The device is merely clipped on or otherwise inserted between the accelerator and the floorboard of the vehicle without special tools and without any calibration procedures involved.

Essentially, the device establishes a predetermined force-distance characteristic for the accelerator pedal. The device comprises an elastic member having an unstable force-distance characteristic, and a mounting means for mounting the member in relation to the accelerator pedal, whereby movement of the pedal in the direction of increased acceleration increases the force applied to the member.

The elastic member itself is formed of sheet spring material and deformed in a certain manner to produce a first force-distance characteristic at relatively short distances, and a second force-distance characteristic at relatively long distances thereto the force-distance characteristic defined graphically by applied force as an ordinate, and by distance of movement as an abscissa. In order to create the alerting character of the device, the elastic member is designed such that the slope of the first characteristic is substantially greater than that of the second characteristic, the member exhibiting a snap action from the first characteristic to the second characteristic at a predetermined distance.

In a preferred embodiment of the invention, the device includes an actuating means mounted with respect to the pedal and the elastic member in order to apply force to the elastic member as the pedal is moved to a position of increased acceleration. The actuating means is preferably in the form of a projection extending from an extension of the elastic member. The extension portion of the elastic member can be a separately hinged plate or merely a unitary extension of the elastic member bent at an acute angle with respect to the plane of the elastic member.

In the latter instance, the device can exhibit a third force-distance characteristic at distances less than the above-mentioned short distances, the slope of the third characteristic being substantially smaller than that of the first characteristic. The third force-distance characteristic is realizable as force is applied to the elastic member just prior to engagement of the actuating means with the engaged portion of the elastic member.

The deformation of the elastic member required to produce the snap action may be in the form of a bulge, bend, bow, kink, bubble, or dimple in a flexible sheet spring. Additionally, the desired characteristics of the elastic member can be obtained by a sheet material formed in the shape of a section of a spherical shell.

In any of the contemplated configurations of the device, the elastic member yields within its elastic limit. Additionally, at least in the second characteristic state of the elastic member, residual stresses are present tending to return the accelerator pedal in the direction of decreased acceleration and the elastic member to a condition exhibiting the first-mentioned characteristic.

In one preferred embodiment of the invention, a single projection extends from the accelerator pedal or from the plate extension of the elastic member to engage the dimple, bubble, etc. The length of such projection may be adjustable. In an alternative embodiment, a pair of projections depending from the pedal engage the elastic member adjacent its edges, thereby causing a bending force to be applied thereto and effecting the same snap action response.

The snap action response of the device is essentially a buckling of the elastic member when the balance of forces are upset to abruptly cause the member to shift from its first force-distance characteristic to its second force-distance characteristic.

In the embodiment of the invention where the elastic member and extension thereof are unitary, the entire device can be stamped from a single sheet of spring metal. The projection and/or projections which actuate the snap action of the device can be in the form of partially stamped and bent portions of the extension part of the stamped spring steel material.

The invention also embodies a mounting means which may attach directly to the accelerator pedal or could include a strap adapted to engage the support rod of the accelerator pedal with an interference fit. To aid in maintaining the device mounted on the rod, a plurality of barbs on the elastic member and on the strap are provided for capturing the support rod therebetween. The barbs also aid in preventing lateral movement of the device once set in position.

By the snap action of the device as the accelerator pedal is depressed, at a predetermined point in the travel of the accelerator pedal an audible sound is heard as the snap action occurs. The audible sound is generated by the abrupt buckling of the elastic member and alerts the driver of a vehicle having the device mounted therein that the accelerator pedal has been moved to a position beyond which the efficiency of fuel usage of the vehicle is diminished.

BRIEF DESCRIPTION OF THE DRAWINGS

The invention will now be described in detail with reference to the accompanying drawings representing the preferred embodiment of a device for establishing a predetermined force-distance characteristic for an accelerator pedal in accordance with the present invention. In the drawings:

FIG. 4 is a curved sheet spring embodiment of the elastic member;

FIG. 5 is a dimpled sheet spring embodiment of the elastic member;

FIG. 6 is a spherical shell section embodiment of the elastic member;

FIG. 7 is a preferred embodiment of the accelerator device according to the invention;

FIG. 8 is an alternative embodiment of the device according to the invention;

DESCRIPTION OF THE PREFERRED EMBODIMENTS

Figure 1:
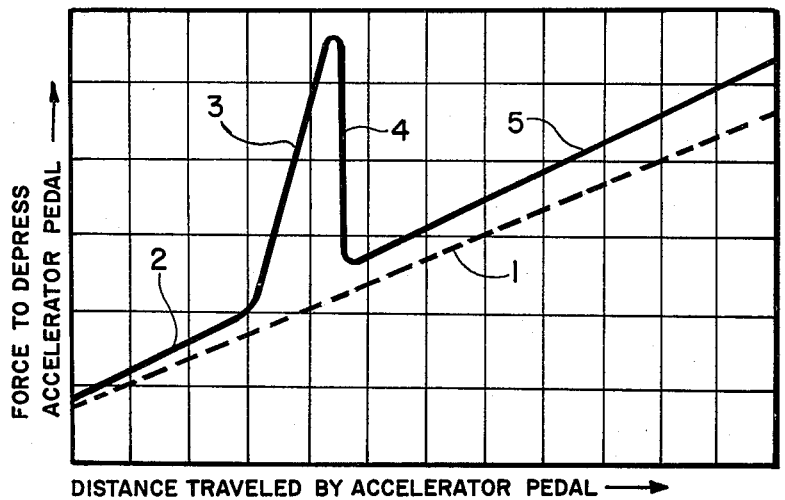
FIG. 1 is a graphical representation of the force versus distance characteristic of an accelerator pedal showing the before and after characteristics without and with the invention incorporated, respectively.

FIG. 1 shows the force-versus-distance characteristics of an accelerator pedal incorporating the accelerator device according to the present invention. The dotted line 1 is the normal force-distance linear characteristic of the accelerator pedal deflection due primarily to the linear elastic portion of a force-distance curve of an appropriate spring. With the device according to the present invention installed beneath the accelerator pedal, the resulting composite curve shown by the solid line in FIG. 1 may be observed.

It should be noted that the accelerator device can take on at least two different functional forms. The device can exhibit the force-distance characteristics shown in FIG. 2, whereby the intial slope 6 (first force-distance characteristic) of the curve is steep as compared to the final slope 8 (second force-distance characteristic) of the curve. Alternatively, the force-distance characteristic can take on the form shown in FIG. 3, wherein there is an initial shallow slope 9 (third force-distance characteristic) as compared with the steeper slope 6.

Figure 2:
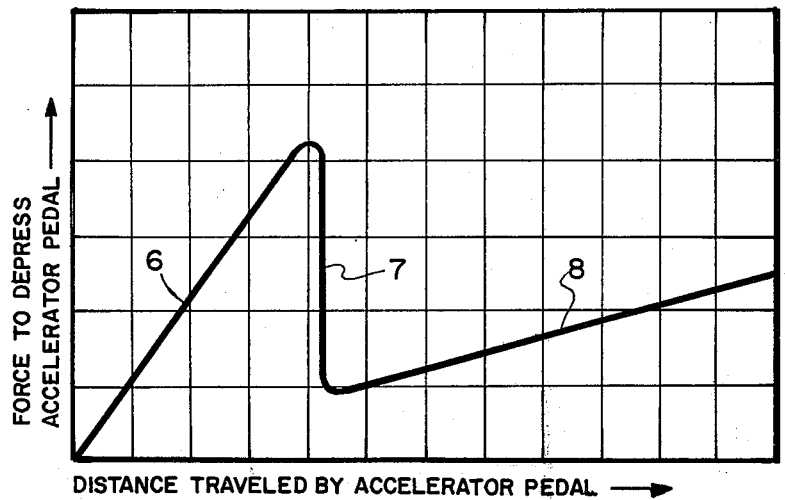
FIG. 2 is a force-distance curve of the elastic member comprising a part of the invention.
Figure 3:
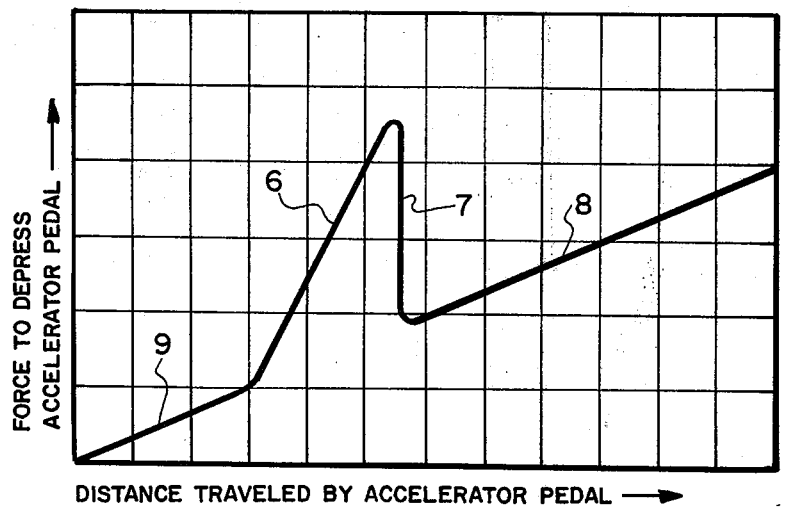
FIG. 3 is a force-distance curve of an alternative embodiment of the elastic member of the invention.

As FIG. 1 is drawn, the solid curve represents a composite of the normal force-distance curve 1 and the force-distance curve of the accelerator device according to FIG. 3. However, it can be appreciated that if the initial slope 2 of the curve in FIG. 1 were to follow the dotted line until it reaches the steeper sloped portion 3, such resulting composite curve would be representative of the combination of the normal accelerator characteristic 1 with the characteristic curve shown in FIG. 2.

As can be seen by reference to FIGS. 1–3, intermediate the higher sloped curve 3 (6) and the shallower sloped curve 5 (8), an abrupt substantially vertical negative slope 4 (7) is observed. The negative sloped portion of the curve is due to a buckling effect of the accelerator device, i.e., initially the shape of the device resists deflection proportionally greater than after buckling occurs. The device thus undergoes an abrupt change in its force-distance characteristic curve due to the buckling effect. As the applied force is reduced, the device exhibits a reverse buckling effect as found by following the curves of FIGS. 1–3 from right to left.

The manner in which this can be accomplished is shown in the drawings of FIGS. 4–6. In each of these drawings, opposing forces $F_1$ and $F_2$ (at points 11 and 12, respectively) act upon a deformed sheet material configuration which initially resists strain until buckling occurs and subsequently permits proportionally greater distance of movement per corresponding unit of applied force.

In particular, FIG. 4 shows a curved sheet of material (curved sheet spring 10), preferably of plastics or metal, which, by its shape has bending modulus greater than that of a flat sheet of the same material, Accordingly, the amount of force necessary to bend the curved sheet is greater than that of a similar sized portion of flat material. However, upon buckling of the material due to the opposing forces $F_1$ and $F_2$ reaching a predetermined value, the bending modulus is much less and approaches that of a flat sheet of material.

In FIG. 5, an alternative embodiment of the elastic member is shown as dimpled sheet spring 13. In the center of dimpled sheet spring 13 is a raised dimple 14 which has the effect of increasing the bending modulus of the sheet spring 13. Again, upon applying opposing forces $F_1$ and $F_2$ to the dimple 14 and edges 15 of the spring 13, respectively, the spring will buckle, and as with the embodiment of FIG. 4, a substantial reduction in slope of the force-distance characteristic curve may be observed.

FIG. 6 shows a hemisphere 16 upon which forces $F_1$ and $F_2$ operate at apex 17 and base 18 respectively to initially be resisted by the formed hemisphere structure and subsequently, after the application of a predetermined level of force, dimple to lower the amount of force necessary to cause a proportional amount of deflection of the curved surface 17. Of course, the device does not need to take the form of a perfect hemisphere, and any dished form of a spring material approaching that of a hemisphere would suffice.

A preferred embodiment of the accelerator device 31 is shown in FIG. 7, wherein elastic member 19 takes on the form of any of the embodiments shown in FIGS. 4–6 (the dimpled sheet spring version of FIG. 5 being preferred). An extension portion 22 is shown hinged about edge 20. A tab projection 21 is shown extending from projection 22 toward dimple 14. In this Figure (FIG. 7), forces $F_3$ and $F_4$ are shown applied to the free ends of the elastic member 19 and extension 22.

The extension 22 is normally mounted under the accelerator pedal 25 (FIGS. 9–12) of a vehicle, and the elastic member 19 is positioned against the floorboard. The device 31 thus comprises an elastic member 19 having an unstable force-distance characteristic, whereby movement of the pedal in the direction of increased acceleration increases the force applied to the member. Positioning of the device in the floorboard of a vehicle beneath the accelerator pedal 25 can be appreciated by reference to FIGS. 9–12 which will be discussed later.

In the emodiment of FIG. 7, as opposing forces $F_3$ and $F_4$ increase, tab 21 approaches dimple 14. Until contact is made between tab 21 and dimple 14, an initial linear elastic characteristic shown at 9 in FIG. 3 is exhibited by the device due to the straining of the hinged edge 20 of the device. Of course, edge 20 might be in the form of a standard pivot hinge, in which case the initial characteristic shown at 6 in FIG. 2 would be observed.

At the moment of contact between tab 21 and dimple 14, the substantially higher sloped curve 6 (FIGS. 2 or 3) is observed. Continued increase in opposing forces $F_3$ and $F_4$ will carry the characteristic to the peak as shown in FIGS. 1–3, at which time buckling of the dimple occurs, and the negative sloped portion 4 (7) results. At this point, a lesser sloped characteristic curve 5 (8) results.

Another embodiment of the invention is shown in FIG. 8 whereby, although a dimpled elastic member 19 is shown, there is no tab to act directly on the dimple. Instead, flanged edges 23 are shown on both the flexible member 19 and extension 22'. When forces $F_3$ and $F_4$ act in opposing direction, mutually engaging portions of the flanged edges 23 meet, and upon increased opposing force between $F_3$ and $F_4$, a bending force at the edges of flexible member 19 is experienced to cause dimple 14 to buckle. Again, the characteristic of the device can take on that shown in FIG. 2 or FIG. 3 depending upon whether or not hinged edge 20 is a free pivot hinge or a unitary portion lying between flexible member 19 and extension 22'.

Figure 9:
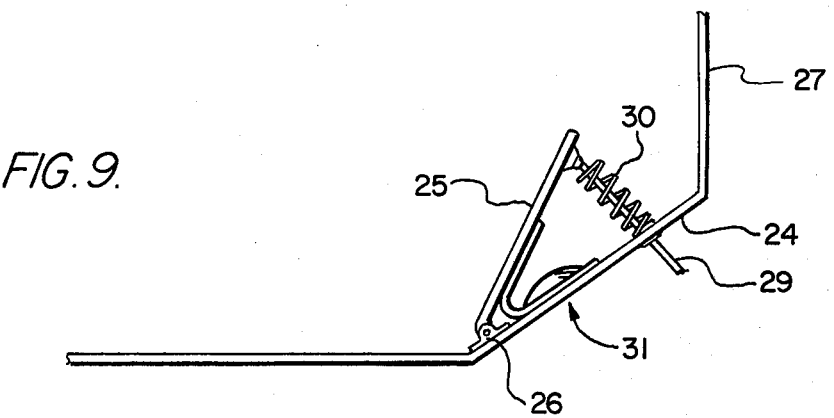
FIG. 9 shows the device mounted under the accelerator pedal of a vehicle.

In FIGS. 9–12, the manner in which the accelerator device 31 might be mounted under the accelerator pedal 25 pivoted at 26 to the floorboard 24 of a vehicle is shown. In FIG. 9, the device is mounted under the accelerator pedal 25 in a wedged fashion. Spring 30 constituting the normal accelerator return spring may or may not be used depending upon the user's desires and the expected characteristics of the combination of the accelerator device 31 and the standard accelerator return spring 30. Although the standard accelerator return spring in the industry is an extension spring mounted near the carburetor of the vehicle for the sake of simplicity in explaining the invention, a simple compression spring such as that shown at 30 is illustrated in the drawings.

Figure 10:
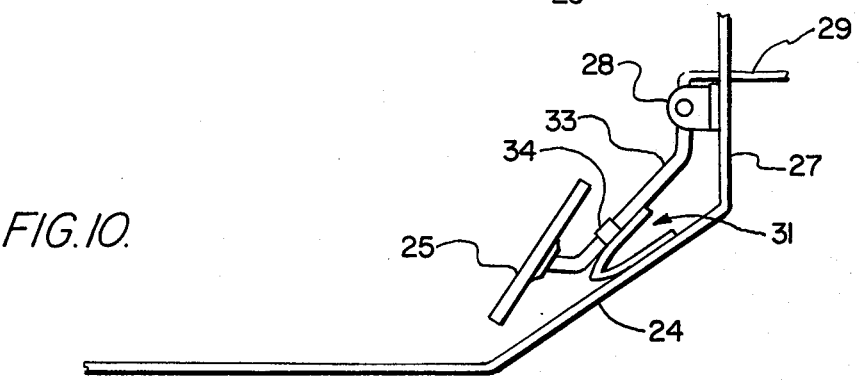
FIG. 10 shows the device on the supporting rod of an accelerator pedal.

FIG. 10 shows application of the device to an accelerator pedal 25 supported at hinge 28 by a mounting attached to the firewall 27. Here, the normal return spring (not shown) for the accelerator pedal reacts with respect to accelerator actuating rod 29 to return the pedal to an upward position as shown in FIG. 10. The device 31 can be strapped by a mounting strap 34 to the accelerator pedal support rod 33 as opposed to being mounted wedge fashion as shown in FIG. 9.

Figure 11:
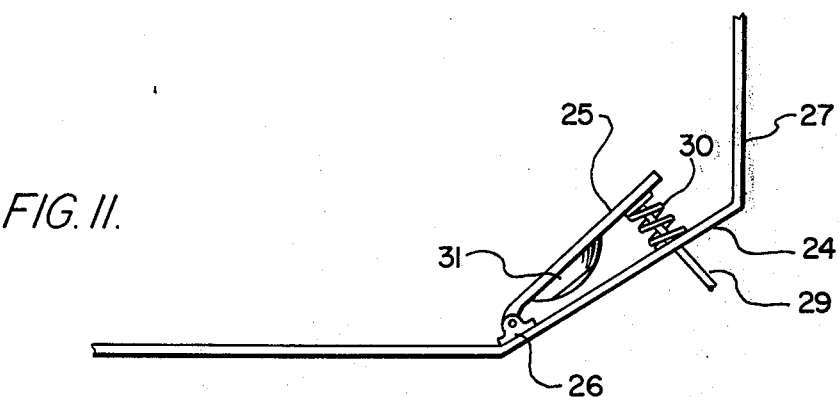
FIG. 11 shows an alternate embodiment of the device mounted on the accelerator pedal.

In FIG. 11, a hemispherical embodiment of the device is shown mounted to the underside of the accelerator pedal 25. In this configuration, the standard return spring 30 is essential, since the initial and desirable slope 2 (FIG. 1) of the characteristic curve would be absent without it.

Figure 12:
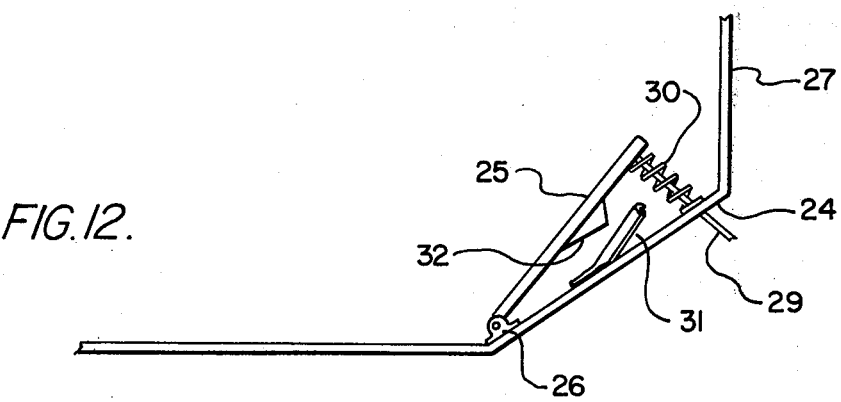
FIG. 12 shows the device mounted under an accelerator pedal with an actuating member depending from the accelerator pedal to engage the device.

If desired, the accelerator device 31 can be mounted on the floorboard 24 as shown in FIG. 12. Either the accelerator pedal 25 itself or an actuating means preferably in the form of an accelerator projection 32 can engage the flexible member portion of the device 31 to operate the same. Specifically in FIG. 12, a curved sheet spring embodiment such as that shown in FIG. 4 is shown mounted on the floorboard 24, while an accelerator projection 32 acts on the upper surface of the sheet spring 31 to produce the desired force-distance characteristic. As with the embodiment of FIG. 11, upon contact with the device 31 by projection 32, the steeper sloped characteristic results. Accordingly, the standard return spring 30 is essential for the initially desired lower sloped characteristic 2 or 9 (FIGS. 1 or 3).

Figure 13:
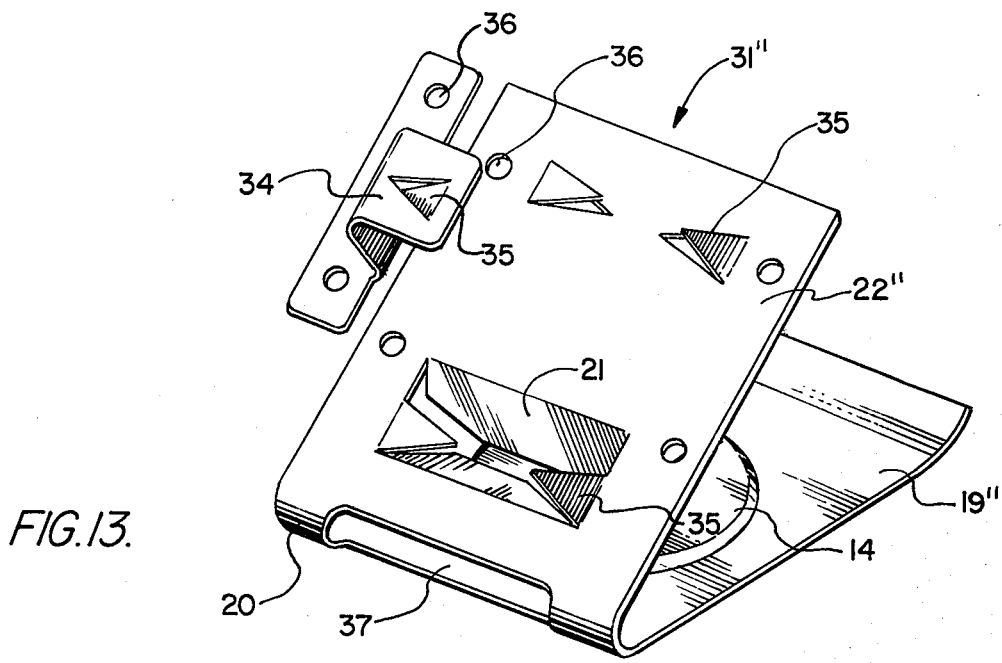
FIG. 13 shows the mounting means according to the invention.

The manner in which the accelerator device 31 can be attached to the accelerator pedal support rod 33 (FIG. 10) is shown in detail in FIG. 13. A mounting strap 34 is provided mounted on the extension 22'' of the accelerator device 31'' by means of mounting holes 36. The barbs 35 on both the strap and the extension serve to capture the support rod therebetween, thereby preventing lateral movement of the device once it is set in position. FIG. 13 also shows a view of tab 21 depending from extension 22'' toward dimple 14. Also shown is the possibility of providing a hinge relief 37 in hinge edge 20 for obtaining the proper force-to-distance ratio for the device 31''.

Figure 14:
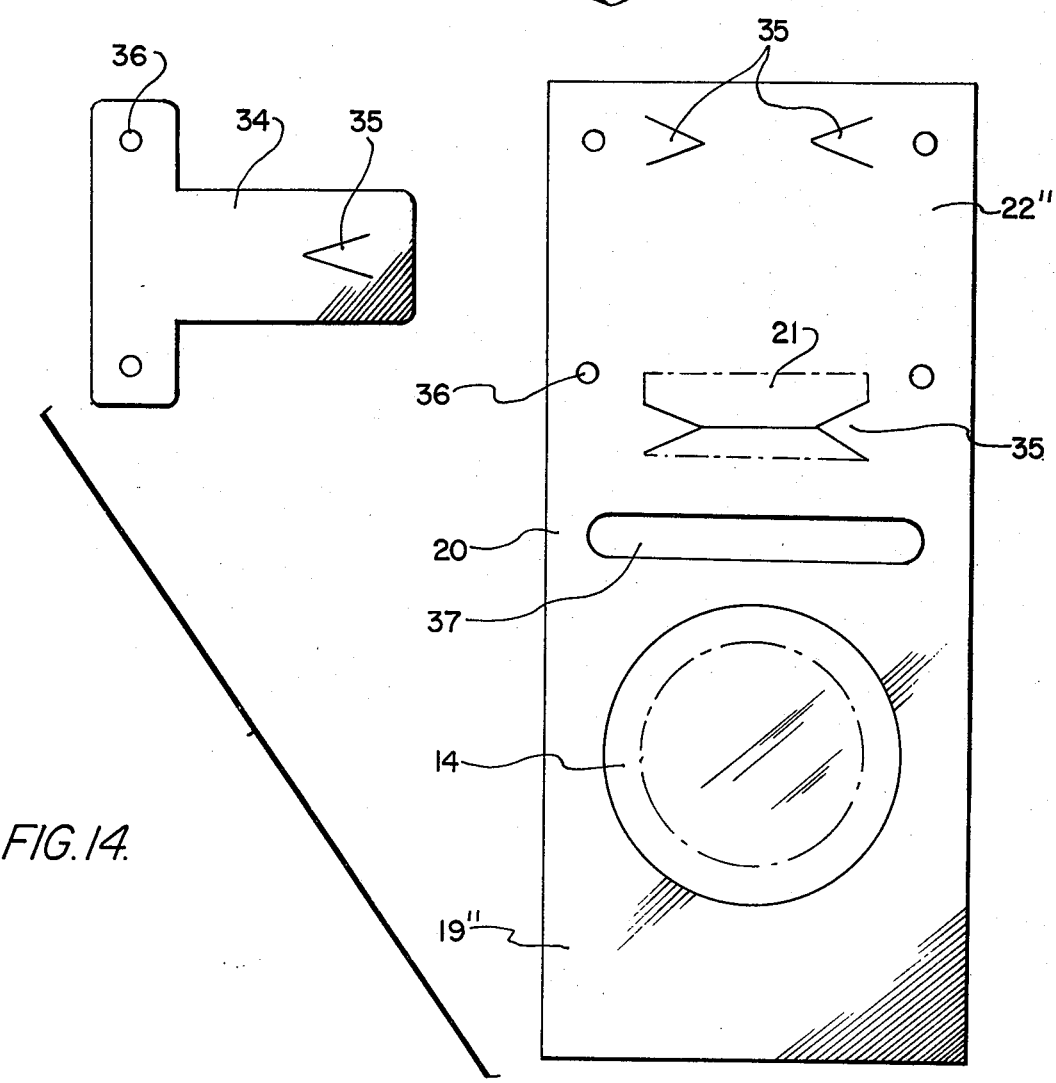
FIG. 14 shows the layout of a pattern for stamping an embodiment of the invention from a single sheet of spring steel.

As previously mentioned, the accelerator device 31'' can be produced from a single piece of sheet material, and FIG. 14 shows the manner in which a layout pattern might be designed preparatory to a stamping operation. After the stamping operation, simple bending and forming operations are performed, the mounting strap 34 is attached, and the device is ready for market.

The mounting strap can also be formed integral with the same single sheet.

It can be appreciated that the above description defines preferred embodiments of the invention which result in the realization of a non-linear force-distance ratio for the deflection of an accelerator foot pedal. In all embodiments, the elastic member 19 is shown formed of sheet spring material (although wire springs might be beneficially utilized) and deformed in a certain manner to produce a steeply sloped first force-distance characteristic at relatively short distances, and a second shallow sloped force-distance characteristic at relatively long distances. If desired, an additional initial shallow sloped third force-distance characteristic can be provided. In all embodiments, the elastic member 19 is designed such that the slope of the first characteristic is substantially greater than that of the second characteristic, the member exhibiting a snap action from the first characteristic to the second characteristic at a predetermined applied force level.

The invention is designed to provide the above-mentioned benefits without the possibility of causing the accelerator pedal to stick open or closed due to a malfunction.

From the foregoing, it can be readily realized that this invention can assume various embodiments. Thus, it is to be understood that the invention is not limited to the specific embodiments described herein, but is to be limited only by the appended claims.

What is claimed is:

1. A device for establishing a predetermined force-distance characteristic for an accelerator pedal, said device comprising:

an elastic member shaped so as to have a first force-distance characteristic at relatively short distances, and a second force-distance characteristic at relatively long distances, said characteristics defined graphically by applied force as an ordinate and distance of movement as an abscissa, the slope of said first characteristic being substantially greater than that of said second characteristic, said member including means exhibiting a snap action from said first characteristic to said second characteristic at a predetermined distance of movement, the ratio of applied force to corresponding distance of movement being within the elastic limit of said member; and mounting means for mounting said elastic member in relation to said accelerator pedal, whereby movement of said pedal in the direction of increased acceleration increases an applied force applied to said elastic member to effect said snap action.

2. The device as claimed in claim 1, wherein said elastic member exhibits residual stresses, tending to return said accelerator pedal in the direction of decreased acceleration.

3. The device as claimed in claim 1, wherein said device has a third force-distance characteristic at distances less than said short distances, the slope of said third characteristic being substantially smaller than that of said first characteristic.

4. The device as claimed in claim 2, wherein said elastic member is a substantially planar flexible sheet spring.

5. The device as claimed in claim 4, wherein said elastic member is a curved flexible sheet spring.

6. The device as claimed in claim 4, wherein said elastic member is a dimpled flexible sheet spring.

7. The device as claimed in claim 1, wherein said elastic member is substantially in the form of a section of a spherical shell.

8. The device as claimed in claim 4 including an actuating means mounted with respect to said pedal and elastic member to apply force to said elastic member as said pedal is moved to a position of increased acceleration.

9. The device as claimed in claim 8, wherein said actuating means is a projection depending from said pedal for engaging a portion of said elastic member.

10. The device as claimed in claim 9, wherein said projection is coupled to an extension of said elastic member, said extension mounted on said pedal and being disposed at an acute angle with respect to the general plane of said elastic member.

11. The device as claimed in claim 10, wherein said extension is hinged to an edge of said elastic member.

12. The device as claimed in claim 10, wherein said extension is a unitary extension of said elastic member bent at an acute angle with respect to the general plane of said elastic member.

13. The device as claimed in claim 9, wherein said actuating means is a pair of projections depending from said pedal for engaging said elastic member adjacent its edges, thereby causing a bending force to be applied thereto.

14. The device as claimed in claim 8, wherein said actuating means and said elastic member are unitary and stamped from a single sheet of spring steel.

15. The device as claimed in claim 1, wherein said mounting means comprises:

a strap adapted to engage the support rod for said pedal with an intereference fit; and a plurality of barbs on said elastic member and said strap for capturing said support rod therebetween.

16. The device as claimed in claim 1, wherein an audible sound is heard when said snap action occurs.

17. The device as claimed in claim 16, wherein the applied force at which snap action occurs is predetermined and represents a limit beyond which the driver of a vehicle having said device mounted therein is aware due to the audible sound.

18. The device as claimed in claim 17, wherein said predetermined limit corresponds to a position of said pedal beyond which the efficiency of fuel usage of said vehicle is diminished.

* * * * *